United States Patent
Medina et al.

(10) Patent No.: US 12,169,433 B1
(45) Date of Patent: Dec. 17, 2024

(54) MONITORING AND DETECTING ERRORS BY LOCATION AND COMMON DEPENDENCY WITHIN A COMPLEX DIGITAL ECOSYSTEM

(71) Applicant: AMERICAN AIRLINES, INC., Fort Worth, TX (US)

(72) Inventors: Luis Medina, Irving, TX (US); Adam Barrow, Grapevine, TX (US); Gary Russell, Lantana, TX (US); Erick Brambila, Bedford, TX (US); David Bell, Colleyville, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 41 days.

(21) Appl. No.: 17/742,995

(22) Filed: May 12, 2022

Related U.S. Application Data

(60) Provisional application No. 63/257,521, filed on Oct. 19, 2021.

(51) Int. Cl.
| | |
|---|---|
| *H04L 67/75* | (2022.01) |
| *G06F 11/07* | (2006.01) |
| *G06F 11/32* | (2006.01) |
| *H04L 41/12* | (2022.01) |
| *H04L 41/22* | (2022.01) |

(52) U.S. Cl.
CPC .......... *G06F 11/076* (2013.01); *G06F 11/323* (2013.01); *H04L 41/12* (2013.01); *H04L 41/22* (2013.01); *H04L 67/75* (2022.05)

(58) Field of Classification Search
CPC .. G06F 11/076; G06F 11/323; G06F 3/04817; H04L 41/12; H04L 41/22; H04L 67/75
See application file for complete search history.

(56) References Cited

U.S. PATENT DOCUMENTS

| | | | |
|---|---|---|---|
| 9,906,578 B2 * | 2/2018 | Aliminati | H04L 67/10 |
| 10,547,521 B1 * | 1/2020 | Roy | H04L 41/0895 |
| 11,182,047 B2 * | 11/2021 | Nayak | F24F 11/64 |
| 2009/0132708 A1 * | 5/2009 | Hayward | G06F 9/5055 |
| | | | 709/226 |
| 2013/0300747 A1 * | 11/2013 | Wong | G06T 11/206 |
| | | | 345/440.2 |

(Continued)

*Primary Examiner* — Rami R Okasha
(74) *Attorney, Agent, or Firm* — HAYNES AND BOONE, LLP

(57) ABSTRACT

A computing device including a display screen, the computing device being configured to display on the screen a visual indication of a health status of a monitored application, wherein the screen displays a listing of interfaces, with each interface affecting the health of the application. Each interface is associated with physical host location(s) and the computing device is additionally configured to display on the display screen a set of status icons associated with each interface in the listing of interfaces. The status icons are simultaneously arranged in a first grouping to visually depict a physical host location associated with the interfaces and a second grouping to visually depict dependencies common between interfaces. Each status icon includes a visual indicator indicating an interface health status of the interface, and the combination of the visual indicators form the visual indication of the health status of the monitored application.

26 Claims, 9 Drawing Sheets

(56) References Cited

U.S. PATENT DOCUMENTS

| | | | |
|---|---|---|---|
| 2014/0330955 A1* | 11/2014 | Bishop | H04L 67/00 |
| | | | 709/224 |
| 2015/0229546 A1* | 8/2015 | Somaiya | H04L 67/10 |
| | | | 715/736 |
| 2019/0199611 A1* | 6/2019 | Kotadia | G06F 9/547 |
| 2019/0356568 A1* | 11/2019 | Dongre | H04L 43/065 |
| 2020/0099773 A1* | 3/2020 | Myers | H04L 67/34 |
| 2020/0127903 A1* | 4/2020 | Chintala | G06F 11/328 |
| 2020/0364618 A1* | 11/2020 | Peh | G06Q 10/0635 |

* cited by examiner

FIG. 2A

AA.COM SYSTEM INTERFACE DASHBOARD

| INTERFACES TO MONITOR WITHIN AA.COM ECOSYSTEM | IMPORTANCE | MONITORING TYPE | MEASURES | | MEASUREMENT | |
|---|---|---|---|---|---|---|
| | | | FREQ | MAX RESP. | 15 MIN | 60 MIN |
| AA.COM TO LDB | CRITICAL | HEALTHCHECK | 60S | 1 SEC | >5 TIMES | >20 TIMES |
| WEB ADMIN TO LDB | IMPORTANT | HEALTHCHECK | 60S | 1 SEC | >5 TIMES | >20 TIMES |
| CMS UTILS TO LDB | IMPORTANT | HEALTHCHECK | 60S | 1 SEC | >5 TIMES | >20 TIMES |
| AA.COM (MANIFI) TO LTU | CRITICAL | HEALTHCHECK | 60S | 1 SEC | >5 TIMES | >20 TIMES |
| VIA ESOA | | | | | | |
| AA.COM TO COMMON SERVICES | VITAL | HEALTHCHECK | 60S | 5 SEC | >5 TIMES | >20 TIMES |
| AA.COM TO ETDS | VITAL | HEALTHCHECK | 60S | 5 SEC | >5 TIMES | >20 TIMES |
| AA.COM TO LOYALTY | CRITICAL | HEALTHCHECK | 60S | 5 SEC | >5 TIMES | >20 TIMES |
| AA.COM TO CUSTOMER HUB | CRITICAL | HEALTHCHECK | 60S | 5 SEC | >5 TIMES | >20 TIMES |
| AA.COM TO CNE | IMPORTANT | HEALTHCHECK | 60S | 5 SEC | >5 TIMES | >20 TIMES |
| AA.COM TO BAGGAGE | IMPORTANT | HEALTHCHECK | 60S | 5 SEC | >5 TIMES | >20 TIMES |
| TO/FROM EXTERNAL SYSTEMS | | | | | | |
| AKAMAI TO AA.COM | VITAL | HEALTHCHECK | 60S | 1 SEC | >5 TIMES | >20 TIMES |
| AA.COM TO ITA-BOOM BOX | VITAL | HEALTHCHECK | 60S | 3 SEC | >5 TIMES | >20 TIMES |

| AA.COM SYSTEM INTERFACE DASHBOARD | | | | | |
|---|---|---|---|---|---|
| INTERFACES TO MONITOR WITHIN AA.COM ECOSYSTEM | IMPORTANCE | MONITORING TYPE | MEASURES | | MEASUREMENT |
| | | | FREQ | MAX RESP. | 15 MIN |
| AA.COM TO LDB | CRITICAL | HEALTHCHECK | 60S | 1 SEC | >5 TIMES |
| WEB ADMIN TO LDB | IMPORTANT | HEALTHCHECK | 60S | 1 SEC | >5 TIMES |
| CMS UTILS TO LDB | IMPORTANT | HEALTHCHECK | 60S | 1 SEC | >5 TIMES |
| AA.COM (MANIFI) TO LTU | CRITICAL | HEALTHCHECK | 60S | 1 SEC | >5 TIMES |
| VIA ESOA | | | | | |
| AA.COM TO COMMON SERVICES | VITAL | HEALTHCHECK | 60S | 5 SEC | >5 TIMES |
| AA.COM TO ETDS | VITAL | HEALTHCHECK | 60S | 5 SEC | >5 TIMES |
| AA.COM TO LOYALTY | CRITICAL | HEALTHCHECK | 60S | 5 SEC | >5 TIMES |
| AA.COM TO CUSTOMER HUB | CRITICAL | HEALTHCHECK | 60S | 5 SEC | >5 TIMES |
| AA.COM TO CNE | IMPORTANT | HEALTHCHECK | 60S | 5 SEC | >5 TIMES |
| AA.COM TO BAGGAGE | IMPORTANT | HEALTHCHECK | 60S | 5 SEC | >5 TIMES |
| TO/FROM EXTERNAL SYSTEMS | | | | | |
| AKAMAI TO AA.COM | VITAL | HEALTHCHECK | 60S | 1 SEC | >5 TIMES |
| AA.COM TO ITA-BOOM BOX | VITAL | HEALTHCHECK | 60S | 3 SEC | >5 TIMES |
| AA.COM TO ITA SEARCH | VITAL | HEALTHCHECK | 60S | 3 SEC | >5 TIMES |
| AA.COM TO TIMATIC | VITAL | HEALTHCHECK | 60S | 3 SEC | >5 TIMES |
| AA.COM TO QUANTUM METRICS | IMPORTANT | HEALTHCHECK | 60S | 3 SEC | >5 TIMES |
| AA.COM TO ROUTE HAPPY | DISCRETIONARY | HEALTHCHECK | 60S | 3 SEC | >5 TIMES |
| TO/FROM INTERNAL AA SYSTEMS | | | | | |
| AA.COM TO MQ IPT (FRAUDNET) | IMPORTANT | HEALTHCHECK | 60S | 1 SEC | >5 TIMES |
| AA.COM TO DYNATRACE | IMPORTANT | HEALTHCHECK | 60S | 1 SEC | >5 TIMES |
| OPEN DEPLOY TO CMS UTILS (CMS) | IMPORTANT | HEALTHCHECK | 60S | 1 SEC | >5 TIMES |
| TEAMSITE TO OPEN DEPLOY (CMS) | IMPORTANT | HEALTHCHECK | 60S | 1 SEC | >5 TIMES |
| AA.COM (MINIFI) TO SPLUNK | IMPORTANT | HEALTHCHECK | 60S | 1 SEC | >5 TIMES |

| 60 MIN | SOUTH REGION - DALLAS ||||||  EAST REGION - WDC ||||||
|--|--|--|--|--|--|--|--|--|--|--|--|--|
| | 15 MIN ||| 60 MIN ||| 15 MIN ||| 60 MIN |||
| | ZONE 1 | ZONE 2 | ZONE 3 | ZONE 1 | ZONE 2 | ZONE 3 | ZONE 1 | ZONE 2 | ZONE 3 | ZONE 1 | ZONE 2 | ZONE 3 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |
| >20 TIMES | 8 | 0 | 0 | 0 | 0 | 0 | 0 | 0 | 0 | 0 | 0 | 0 |

FROM FIG. 4A

| AA.COM SYSTEM INTERFACE DASHBOARD | | | | | |
|---|---|---|---|---|---|
| INTERFACES TO MONITOR WITHIN AA.COM ECOSYSTEM | IMPORTANCE | MONITORING TYPE | MEASURES FREQ | MEASURES MAX RESP. | MEASUREMENT 15 MIN |
| AA.COM TO LDB | CRITICAL | HEALTHCHECK | 60S | 1 SEC | >5 TIMES |
| WEB ADMIN TO LDB | IMPORTANT | HEALTHCHECK | 60S | 1 SEC | >5 TIMES |
| CMS UTILS TO LDB | IMPORTANT | HEALTHCHECK | 60S | 1 SEC | >5 TIMES |
| AA.COM (MANIFI) TO LTU | CRITICAL | HEALTHCHECK | 60S | 1 SEC | >5 TIMES |
| VIA ESOA | | | | | |
| AA.COM TO COMMON SERVICES | VITAL | HEALTHCHECK | 60S | 5 SEC | >5 TIMES |
| AA.COM TO ETDS | VITAL | HEALTHCHECK | 60S | 5 SEC | >5 TIMES |
| AA.COM TO LOYALTY | CRITICAL | HEALTHCHECK | 60S | 5 SEC | >5 TIMES |
| AA.COM TO CUSTOMER HUB | CRITICAL | HEALTHCHECK | 60S | 5 SEC | >5 TIMES |
| AA.COM TO CNE | IMPORTANT | HEALTHCHECK | 60S | 5 SEC | >5 TIMES |
| AA.COM TO BAGGAGE | IMPORTANT | HEALTHCHECK | 60S | 5 SEC | >5 TIMES |
| TO/FROM EXTERNAL SYSTEMS | | | | | |
| AKAMAI TO AA.COM | VITAL | HEALTHCHECK | 60S | 1 SEC | >5 TIMES |
| AA.COM TO ITA-BOOM BOX | VITAL | HEALTHCHECK | 60S | 3 SEC | >5 TIMES |
| AA.COM TO ITA SEARCH | VITAL | HEALTHCHECK | 60S | 3 SEC | >5 TIMES |
| AA.COM TO TIMATIC | VITAL | HEALTHCHECK | 60S | 3 SEC | >5 TIMES |
| AA.COM TO QUANTUM METRICS | IMPORTANT | HEALTHCHECK | 60S | 3 SEC | >5 TIMES |
| AA.COM TO ROUTE HAPPY | DISCRETIONARY | HEALTHCHECK | 60S | 3 SEC | >5 TIMES |
| TO/FROM INTERNAL AA SYSTEMS | | | | | |
| AA.COM TO MQ IPT (FRAUDNET) | IMPORTANT | HEALTHCHECK | 60S | 1 SEC | >5 TIMES |
| AA.COM TO DYNATRACE | IMPORTANT | HEALTHCHECK | 60S | 1 SEC | >5 TIMES |
| OPEN DEPLOY TO CMS UTILS (CMS) | IMPORTANT | HEALTHCHECK | 60S | 1 SEC | >5 TIMES |
| TEAMSITE TO OPEN DEPLOY (CMS) | IMPORTANT | HEALTHCHECK | 60S | 1 SEC | >5 TIMES |
| AA.COM (MINIFI) TO SPLUNK | IMPORTANT | HEALTHCHECK | 60S | 1 SEC | >5 TIMES |

|  | SOUTH REGION - DALLAS | | | | | | EAST REGION - WDC | | | | | |
|---|---|---|---|---|---|---|---|---|---|---|---|---|
|  | 15 MIN | | | 60 MIN | | | 15 MIN | | | 60 MIN | | |
| 60 MIN | ZONE 1 | ZONE 2 | ZONE 3 | ZONE 1 | ZONE 2 | ZONE 3 | ZONE 1 | ZONE 2 | ZONE 3 | ZONE 1 | ZONE 2 | ZONE 3 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 15 | 15 | 15 | 30 | 29 | 27 | 15 | 15 | 14 | 32 | 31 | 25 |
| >20 TIMES | 15 | 15 | 15 | 30 | 29 | 27 | 15 | 15 | 14 | 32 | 31 | 25 |
| >20 TIMES | 15 | 15 | 15 | 30 | 29 | 27 | 15 | 15 | 14 | 32 | 31 | 25 |
| >20 TIMES | 15 | 15 | 15 | 30 | 29 | 27 | 15 | 15 | 14 | 32 | 31 | 25 |
| >20 TIMES | 15 | 15 | 15 | 30 | 29 | 27 | 15 | 15 | 14 | 32 | 31 | 25 |
| >20 TIMES | 15 | 15 | 15 | 30 | 29 | 27 | 15 | 15 | 14 | 32 | 31 | 25 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 15 | 15 | 15 | 22 | 22 | 22 | 15 | 15 | 15 | 22 | 22 | 22 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |
| >20 TIMES | 0 | 0 | 0 | 0 | 0 | 0 | 0 | 0 | 0 | 0 | 0 | 0 |

FROM FIG. 5A

FIG. 5B

MONITORING AND DETECTING ERRORS BY LOCATION AND COMMON DEPENDENCY WITHIN A COMPLEX DIGITAL ECOSYSTEM

CROSS-REFERENCE TO RELATED APPLICATION

This application claims the benefit of the filing date of, and priority to, U.S. Application No. 63/257,521, filed Oct. 19, 2021, the entire disclosure of which is hereby incorporated herein by reference.

TECHNICAL FIELD

This disclosure relates in general to the detection of errors in a complex digital ecosystem and specifically to a user interface for monitoring and detecting errors that affect an application or product.

BACKGROUND

Using conventional technology, Information Technology ("IT") application teams are required to utilize multiple tools to monitor the health of one application and/or product. While existing application performance monitoring tools provide real time metrics and monitoring, and log monitoring tools allow teams to view errors in the logs, use of these tools requires opening up multiple applications and navigating through each to view different displays/dashboards. Moreover, and even if a user could view all of the conventional displays/dashboards simultaneously, an underlying source of error may not be apparent.

Source errors are not apparent using conventional technology in part because conventional technology does not allow for dependencies to be noted between applications/products nor for the topology of the products/applications to be noted. As such, the upstream or downstream effects of having an issue/error in one application/interface is not easily determined using conventional technology. Having a product or application "down" or not fully functioning even for a few hours can cause major disruptions within a company, such as an airline, or even an entire industry. Quickly identifying and addressing an underlying issue is extremely important to prevent or reduce productivity loss, brand damage, data loss, and/or disruptions such as flight delays, flight cancellations, delay in bookings, and lost bookings. In the airline industry, in which crews have strict duty and rest requirements and airplane/gate turn times are highly sensitive to disruptions, having errors in an application or product can cause a cascading disruption event.

BRIEF DESCRIPTION OF THE DRAWINGS

FIGS. 2A and 2B together are an illustration of a window displayed on the UI of the computer of FIG. 1, according to an example embodiment.

FIGS. 4A and 4B together form an illustration of a window displayed on the UI of the computer of FIG. 1, according to an example embodiment.

FIGS. 5A and 5B together form an illustration of another window displayed on the UI of the computer of FIG. 1, according to an example embodiment.

DETAILED DESCRIPTION

Figure 1:
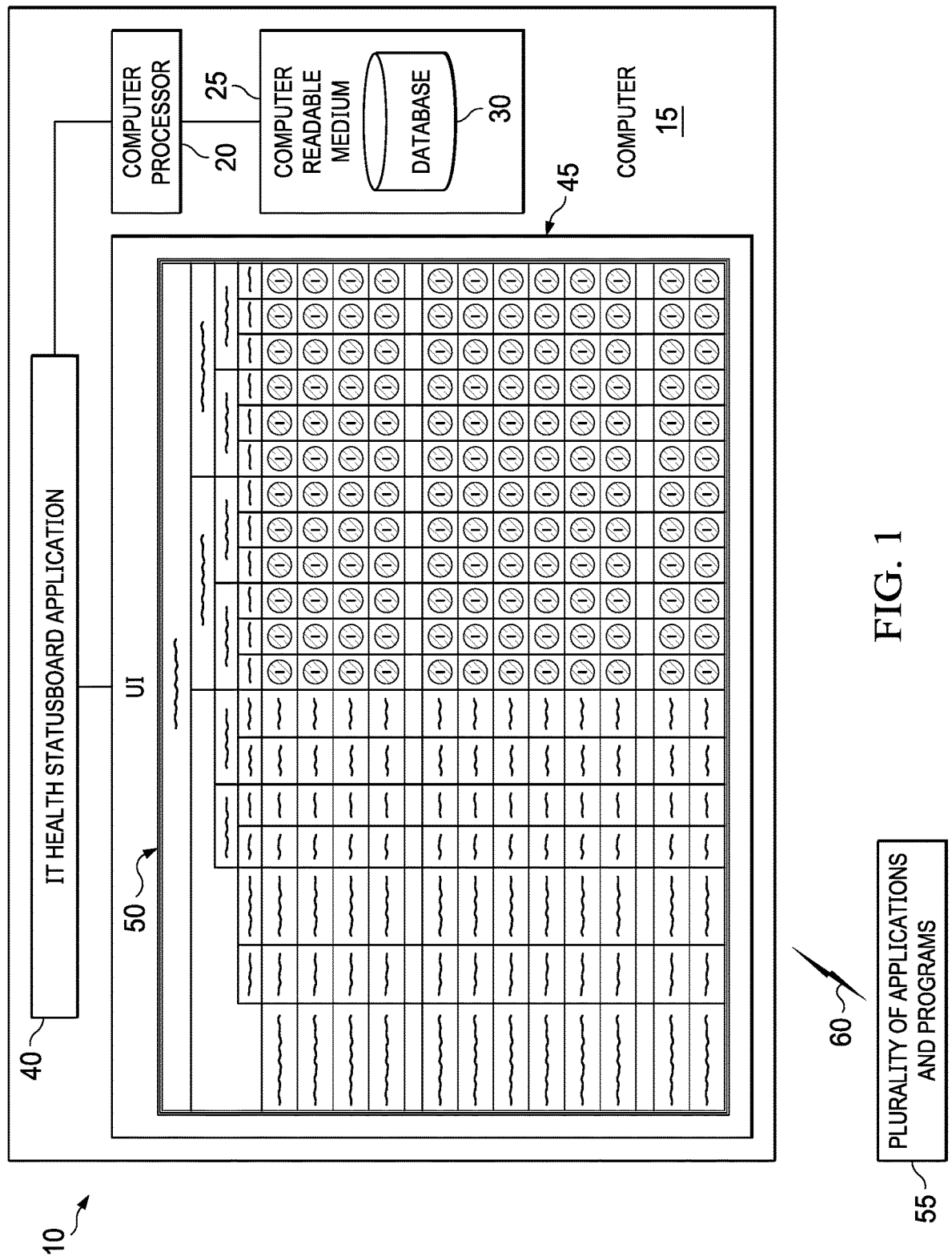
FIG. 1 is a diagrammatic illustration of system configured to display a dashboard for monitoring and detecting interface errors by location and common dependency within a complex digital ecosystem, the system including a computer including a user interface ("UI") that is configured to display a plurality of windows.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Using conventional technology, IT application teams are required to utilize multiple tools to monitor the health of one application and/or product. While existing application performance monitoring tools provide real time metrics and monitoring, and log monitoring tools allow teams to view errors in the logs, use of these tools requires opening up multiple applications and navigating through each to view different displays/dashboards. Moreover, and even if a user could view the large number of conventional displays/dashboards simultaneously, an underlying source of error may not be apparent. With complex digital ecosystems, such as digital ecosystems involving 1,500 service components, the monitoring and detecting of errors within interfaces using conventional technology is slow and inefficient.

Source errors are not apparent using conventional technology in part because conventional technology does not allow for dependencies to be noted between applications/products nor for the topology of the products/applications to be noted. As such, the upstream or downstream effects of having an issue/error in one application/interface is not easily determined using conventional technology. Having a product or application "down" or not fully functioning even for a few hours can cause major disruptions within a company, such as an airline, or even an entire industry. Quickly identifying and addressing an underlying issue is extremely important to prevent or reduce productivity loss, brand damage, data loss, and/or disruptions such as flight delays, flight cancellations, delay in bookings, and lost bookings. In the airline industry, in which crews have strict duty and rest requirements and airplane/gate turn times are highly sensitive to disruptions, having errors in an application or product can cause a cascading disruption event.

In an example embodiment, as illustrated in FIG. 1, a system is generally referred to by the reference numeral 10 and includes a computer 15 that includes a computer processor 20 and a computer readable medium 25 operably coupled thereto. Instructions accessible to, and executable by, the computer processor 20 are stored on the computer readable medium 25. A database 30 is also stored in the computer readable medium 25. An IT Health Statusboard application 40 is stored in, and executable on, the computer 15. In some embodiments, the application 40 is stored as instructions in the computer readable medium 25. The computer 15 also includes a user interface ("UI") or display 45 capable of displaying a window 50. The system 10 also includes a plurality of applications and programs 55. The computer 15 and the applications and programs 55 are connected via a network 60.

In some embodiments, the Statusboard application 40 is a technical improvement over conventional technology because the application 40 provides a comprehensive and complete view of the health status of an application and/or product, its dependencies, and its interfaces. The application 40 also more granularity regarding the health status of the application and/or product. This solves problems in the technical field of application monitoring and error detection by allowing a viewer of the window 50 to quickly identify where an underlying issue lies within the application or within an upstream application/interface.

In one or more example embodiments, the Statusboard application 40 or a portion thereof is stored in the computer readable medium 25 of the computer 15 and/or is stored in "the cloud." In some embodiments, the Statusboard application 40 includes and/or executes one or more web-based programs, Intranet-based programs, and/or any combination thereof. In an example embodiment, the Statusboard application 40 includes a computer program including a plurality of instructions, data, and/or any combination thereof. In an example embodiment, the application is written in, for example, Hypertext Markup Language (HTML), Cascading Style Sheets (CSS), JavaScript, Extensible Markup Language (XML), asynchronous Javascript and XML (Ajax), iOS, XCode, Swift, and/or any combination thereof. In an example embodiment, the Statusboard application 40 pulls real-time information from the plurality of applications and programs 55 and/or applications and programs that monitor the health of the applications and programs 55.

In some embodiments, the plurality of applications and programs 55 includes a web application, such as aa.com, and other programs, such as Common Services, ETDS, Loyalty, Customer Hub, CNE, Baggage, Akamai, ITA Boom box, ITA Search, Timatic, Quantum Metrics, Route Happy, MQ IPT, Dynatrace, Open Deploy, CMU Units, TeamSite, Open Deploy, Splunk, LDB, LTU and many others. In some embodiments, the plurality of application and programs 55 includes a Cybersecurity program that includes Threat and Vulnerability Management Programs, Cybersecurity Incident Response Programs, Identity and Access Management Programs, etc. In some embodiments, the Threat and Vulnerability Management Programs may include or depend on any one or more of Threat Intelligence Services, Vulnerability Scanning, Static Application Security Testing, Cyber Security Risk Management and Analytics, Enterprise Software Vulnerability Management ("ESVM"), and Phish Testing. In some embodiments, the Cybersecurity Incident Response Program may include a Security Orchestration and Automated Response Program and a Security Analytics Platform. In some embodiments, the Identity and Access Management Program may include or depend upon an API Security Gateway, Active Directory, Active Directory Federation Services, Federation Service, Enterprise Authentication Services, Identity Sync Engine, Enterprise Oracle, Identity Management, Enterprise Directory Services, Travel Access Management System, and an Enterprise Multi-factor Authentication.

In an example embodiment, the network 60 includes the Internet, one or more local area networks, one or more wide area networks, one or more cellular networks, one or more wireless networks, one or more voice networks, one or more data networks, one or more communication systems, and/or any combination thereof. In some embodiments, the network 60 also includes WIFI, Bluetooth, and Long-Term Evolution ("LTE") or other wireless broadband communication technology.

Figure 2B:
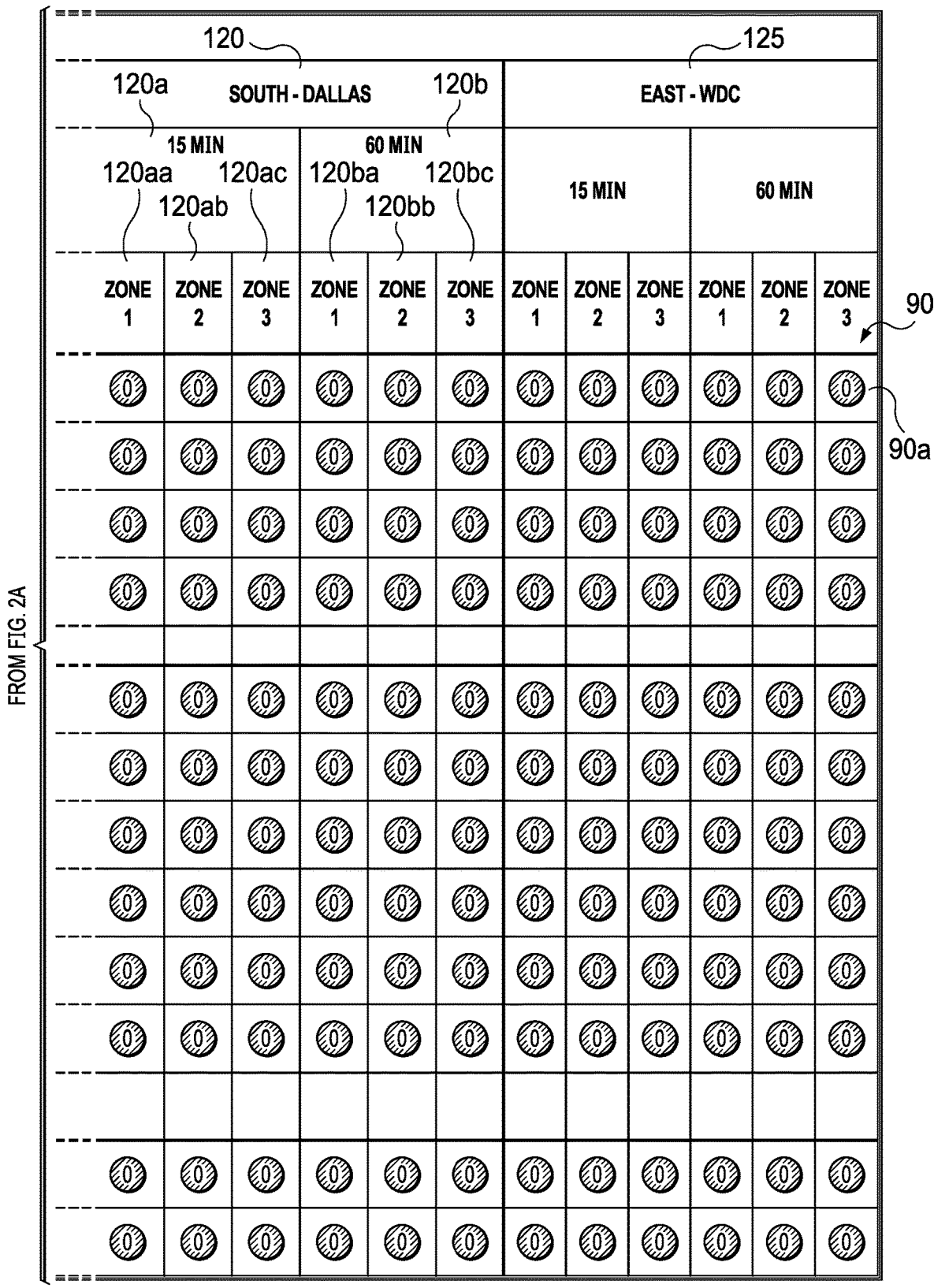

FIGS. 2A and 2B illustrate an example of a dashboard 70 displayed by the Statusboard application 40 via the window 50. The dashboard 70 identifies a monitored application or product 75, such as the AA.com System, that is the subject of the statusboard 70. Generally, the dashboard 70 provides a visual indication of a health status of the monitored application 75. The dashboard 70 also includes a listing of interfaces 80 to monitor, with each interface in the listing of interfaces 80 affecting the health of the monitored application or product 75. Generally, the health of a monitored application refers to the performance and function of the monitored application. In some embodiments, a functioning interface between the monitored application and another application or program is vital to the performance of the monitored application. If a vital interface is not functioning, then the monitored application may be "down" or not able to provide the function that it was designed to provide. An example of a vital interface is an interface between an application that displays or provides data regarding the location of baggage or luggage and the program or application that tracks the location of baggage or luggage. If the interface between these two applications is not functioning, then the application that tracks the luggage cannot provide the data regarding the location of the luggage to the application that displays this information. Generally, an interface is between a first application/program and a second application/program. As illustrated in FIGS. 2A and 2B, in some instances one of the first application/program and the second application/program is the monitored application, but in other instances neither is the monitored application. In some embodiments, a functioning interface indicates that both of the first application/program and the second application/program are functioning. That is, a functioning interface reflects the health of the linked applications.

As illustrated in FIG. 2A or 2B, the listing of interfaces 80 is listed vertically along a first axis 85. The dashboard 70 also includes a plurality or set of status icons 90 associated with each interface in the listing of interfaces 80. In some embodiments, the status icons associated with one interface are arranged horizontally along a second axis 95 that is perpendicular to the first axis 85 and in line with its associated interface. As illustrated, the listing of interfaces 80 are arranged in different rows within one column. Each row includes the interface and also data and status icons associated with the interface. As such, the status icons are simultaneously arranged in a first grouping (e.g., along the first axis 85) and a second grouping (e.g., along the second axis 95). For example, the "aa.com to LDB" is a first interface 80a and it is in line or in the same row with its associated status icons 90a. The statusboard 70 also includes an "Importance" column 100, a "Monitoring Type" column 105, a "Measures" column 110 with subcolumns "Freq." 110a and "Max Resp" 110b, a "Measurement" column 115 with subcolumns "15 Min" 115a and "60 Min" 115b. Additional columns are included that relate to a physical host location, such as columns for "South-Dallas" 120 and "East-WDC" 125. The "South-Dallas" 120 column also includes multiple subcolumns. For example, under the "South-Dallas" 120 column are two sub columns: "15 Min" 120a and "60 Min" 120b. Further, the "15 Min" subcolumn includes three further subcolumns: "Zone 1" 120aa, "Zone 2" 120*ab*, and "Zone 3" 120*ac*. Similarly, the "60 Min" 120*b* subcolumns includes three subcolumns: "Zone 1" 120*ba*, "Zone 2" 120*bb*, and "Zone 3" 120*bc*. The "East-WDC" 125 column includes identical subcolumns.

In some embodiments, the "Importance" column 100 indicates the importance of its associated interface with the monitored application 70. In some embodiments, the "Importance" column 100 may include one of a set number of importance indicators, with each importance indicator tied to the severity of disturbance to the monitored application or product 75 if the interface fails. For example, the set of importance indicators may include, from the most severe disturbance to the least severe distance, vital, critical, important, and discretionary. However, other importance indicators may be included.

In some embodiments, the "Monitoring Type" column 105 indicates the type of monitoring performed for each interface/application or the type of monitoring metric used to indicate the health of that system. As illustrated, "Healthcheck" is listed as a generic monitoring in the Monitoring Type column 110, but the type of monitoring type listed in the column 110 is generally dependent on the type of application or interface to be monitored and the health of the service/component/dependency. For example, monitoring types may include ping checks, synthetic checks that are simulated user tests, service level objects that represent a percentage of successful busines transactions, etc. Other types of healthchecks may be used and listed in the monitoring type column 105.

In some embodiments, the "Measures" column 110, with subcolumns "Freq." 110*a* and "Max Resp." 110*b*, lists the frequency of the healthcheck and the maximum response time for the healthcheck. As illustrated in FIGS. 2A and 2B, the frequency in subcolumn 110*a* is listed in seconds, such as 60 seconds. However, other units of time and measures of time can be included in column 110*a*. The maximum response time for the healthcheck is listed in seconds, such as 1 second, 3 second, or 5 seconds. However, other units of time and measures of time can be included in column 110*b*.

In some embodiments, the "Measurement" column 115, with subcolumns "15 Min" 115*a* and "60 Min" 115*b*, lists a threshold value for the number of failed health checks that can be received within the respective 15 minutes and 60 minutes before the visual indicator of a status icon changes to a failed indication. For example, the ">5 Times" in the "15 Min" subcolumn 115*a* for the interface 80*a* indicates that more than 5 failed health checks being received within 15 minutes is a threshold that affects one or more of the status icons 90*a*. Similarly, the ">20 Times" in the "60 Min" subcolumn 115*b* for the interface 80*a* indicates that more than 20 failed health checks being received within 60 minutes is a threshold that affects one or more of the status icons 90*a*. The time periods listed in the subcolumns 115*a* and 115*b* may be altered to any time period and is not limited to 15 minutes and 60 minutes, respectively. Moreover, the threshold values may be any number of values. In some embodiments, one period of time is subsumed in the other period of time. For example, one period of time may be 5 minutes from the present time and the other period of time is 20 minutes from the present time, which subsumes the 5 minutes from the present time.

In some embodiments, the column for "South-Dallas" 120 includes the subcolumns 120*a* and 120*b* having titles of "15 Min" and "60 Min", which correspond to the period of time of subcolumns 115*a* and 115*b*. One status icon from the status icons 90*a* is within the columns 120*aa*, 120*ab*, and 120*ac* and each includes a visual indicator reflecting a 15-minute health status of the application/interface 80*a* associated with zone 1, zone 2, and zone 3, respectively. In some embodiments, zones 1, 2, and 3 are physical host locations. For example, zone may refer to IBM cloud locations where a web application is hosted. In other embodiments, zones 1, 2, and 3 are relating to different infrastructure or hardware associated with "South-Dallas." One status icon from the status icons 90*a* is within the columns 120*ba*, 120*bb*, and 120*bc* and each includes a visual indicator reflecting a 60-minute health status of the application/interface 80*a* associated with zone 1, zone 2, and zone 3, respectively. As illustrated and in some embodiments, the details of the healthchecks are provided in the columns 105, 110, and 115, and the results of the healthchecks are provided via the columns 120 and 125.

In some embodiments, each status icon includes a visual indicator indicating an interface health status of the interface, and together, the combination of the visual indicators is the visual indication of the health status of the application 75. In some embodiments, the visual indicator is a color or background color of the status icon. For example, if the number of failed health checks performed in the predetermined period of time is equal to or less than a threshold value, then the color or background color of the status icon may be a green color or other first color. However, if the number of failed health checks performed in predetermined period of time is greater than the threshold value, then the color or background color of the status icon may be a red color or other second color. In some embodiments, the status icons are positioned within the "15 Min" subcolumn 120*a* are associated with a predetermined period of time of 15 minutes and a threshold of 5, or the number within the subcolumn 115*a*. Similarly, the status icons positioned within the "60 Min" subcolumn 120*b* are associated with a predetermined period of time of 60 minutes and a threshold of 20, or the number within the subcolumn 115*b*. In some embodiments, the status icon includes a visual indicator that is a numerical value. For example, the numerical value of "0" is displayed on the status icons 90*a*. This numerical value is associated with the number of failed healthchecks that have occurred within the predetermined periods of time. As the numerical value of "0" is displayed in the status icons 90*a*, the color of the status icon may be green to provide visual indicator of the health status of the interface/application at a physical host location.

The listing of interfaces 80 is grouped along the first axis 85 based on common dependencies between interfaces. For example, and as illustrated in FIGS. 2A and 2B, the interfaces having a common dependency upon an Enterprise Service Oriented Architecture are grouped together along the first axis 85 and labeled under a subheading of "Via eSOA" to identify the common dependency. Other common dependencies may include "Within AA.com Ecosystem," "To/From External Systems," and "To/From Internal AA Systems." Additional or other common dependencies are possible and are dependent upon the monitored application or program 75.

In some embodiments, the grouping of the status icons (e.g., along the first axis 85) visually depicts dependencies that are common between interfaces. That is, the location of the status icons along the first axis 85 is sorted or arranged by common dependencies. In some embodiments, the grouping of the status icons (e.g., along the second axis 95) visually depicts a physical host location associated with the interfaces. That is, the location of the status icons along the second axis 95 is sorted or arranged by physical location.

Figure 3:
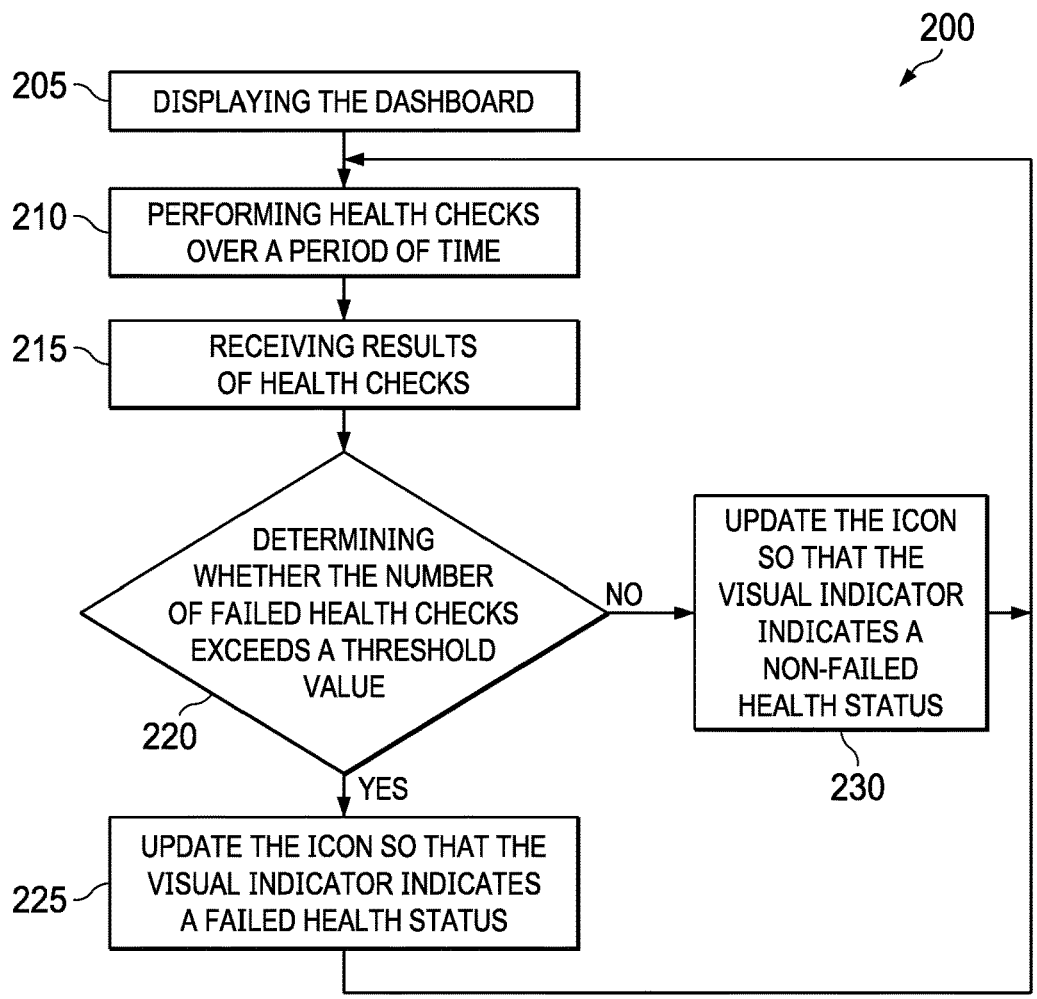
FIG. 3 is a method of using the system of FIG. 1, according to an example embodiment.

In an example embodiment, as illustrated in FIG. 3 with continuing reference to FIGS. 1, 2A, and 2B, a method 200 of operating the system 100 includes displaying the dashboard 70 at step 205; performing health checks over a predetermined period of time at step 210; receiving results of the health checks at step 215; determining whether the number of failed health checks exceeds a threshold value at step 220; if yes, then update the corresponding status icon so that the visual indicator indicates a failed health status at step 225; if no, then update the status icon so that the visual indicator indicates a non-failed health status at step 230. The method 200 then continues with the next step, which is the step 210.

In some embodiments and at the step 205, the dashboard 70 is displayed at the step 205. Generally, the dashboard 70 is displayed in or via the window 50 of the user interface 45.

In some embodiments and at the step 210, the system 10 performs health checks over a predetermined period of time. As noted above, while "healthchecks" is provided in the "Monitoring Type" column 105 of FIGS. 2A and 2B, the type of healthcheck performed is dependent upon the type of application/product/program that is being monitored. As such, the health check may include ping checks, synthetic checks that are simulated user tests, service level objects that represent a percentage of successful busines transactions, among others. In some embodiments, and when the system 10 does not perform the health checks, the step 210 is omitted. In some embodiments, and as detailed below, the system 10 receives the results of the health checks from a third party or applications that do not form a portion of the system 10.

In some embodiments and at the step 215, the application 40 receives results of the health checks. That is, the application 40 tracks the results of the health checks as well as the timing of the results. In some embodiments, the system 10 receives the results of the health checks from a third party or applications that do not form a portion of the system 10. Regardless of which entity performs the health checks, the application 40 receives the results of the health checks.

In some embodiments and at the step 220, the system 10 determines whether the number of failed health checks exceeds a threshold value. In the example provided in FIGS. 2A and 2B, the threshold is "5" failed health checks over 15 minutes and "20" failed health checks over 60 minutes. The system 10 is not limited to the listed thresholds and predetermined periods of time. In some embodiments, the application 40 determines whether the number of failed health checks exceeds the threshold value.

In some embodiments and at the step 225, the system 10 updates the corresponding status icon so that the visual indicator indicates a failed health status. When the number of failed health checks exceeds the threshold value, then the status icon associated with the failed health checks is updated—or remains if already indicating a failed health status—to indicate a failed health status.

In some embodiments and at the step 230 the system 10 updates the corresponding status icon so that the visual indicator indicates a non-failed health status. When the number of failed health checks is equal to or is less than the threshold value, then the status icon associated with the failed health checks is updated—or remains if already indicating a non-failed health status—to indicate a non-failed health status.

After each of the steps 225 and 230, the next step is the step 210. Generally, the method repeats to continuously monitor the health of the monitored application or program 75.

Generally, the status icons provide a visual indication of the overall health of the monitored application or product 75. Generally, the array of status icons (i.e., in the first grouping and second grouping) allow for underlying issues/errors to be quickly spotted and identified. That is, and as illustrated in FIGS. 4A-4B, when a plurality of status icons in one column indicates failed health checks, then the associated zone (e.g., Zone 1 of the South Region-Dallas) can be troubleshot to determine if there is an error associated with, or caused by, something relating to the physical location (e.g., zone 1, zone 2, or zone 3 of South-Dallas). The combination of failed health status indicators and non-failed health status indicators provides a visual indication that the error is associated with a location instead of a common product shared between the interfaces. Moreover, and as illustrated in FIGS. 4A and 4B, when the failed health status indicators are only within the "15 minute" column 120a and not within the "60 minute" column 120b, this also provides a visual indication that the error is or failed health status is recent (i.e., within the past 5 minutes) and is not a prolonged error or failed health status, as the status indicators for the "60 minute" column 120b indicate a healthy status. Additionally, when the failed health status indicators are only within the "60 minute" column 120b and not within the "15 minute" column 1201, this also provides a visual indication that a previous error or previous failed health status has recently been cleared (i.e., within the past 15 minutes due to the status indicators for the 15 minute period of time not indicating a failed health status). Thus, the visual indication of the health status of the monitored application includes a visual timeline of the health status of the monitored application, with the combination of the visual indicators for the first period of time and the visual indicators for the second period of time providing the visual timeline.

Another example is illustrated in FIGS. 5A-5B, in which entire rows include status icons that have a failed health status indicator. Every interface/application listed under the "Via eSOA" heading has status icons with failed health status indicators, whereas no rows in the common dependency header of "Within AA.com EcoSystem" include status icons that have a failed health status indicator. The combination of failed health status indicators and non-failed health status indicators provides a visual indication that the error is associated with a common product or dependency (e.g., common dependency of "Via eSOA") instead of a common location. The row associated with "aa.com to Quantum Metrics" is the only row under the header of "To/From External Systems" that has status icons with failed health status indicators. This combination of failed health status indicators and non-failed health status indicators provides a visual indication that the error is or may be associated with the external system Quantum Metrics itself instead of a location specific error.

FIGS. 4A-4B and 5A-5B depict a statusboard that is only slightly altered from the statusboard of FIGS. 2A and 2B. As such, numerals designating the columns, status icons, listing of interfaces, etc. that are identical to those elements in FIGS. 2A and 2B are omitted in FIGS. 4A-4B and 5A-5B.

Figure 6:
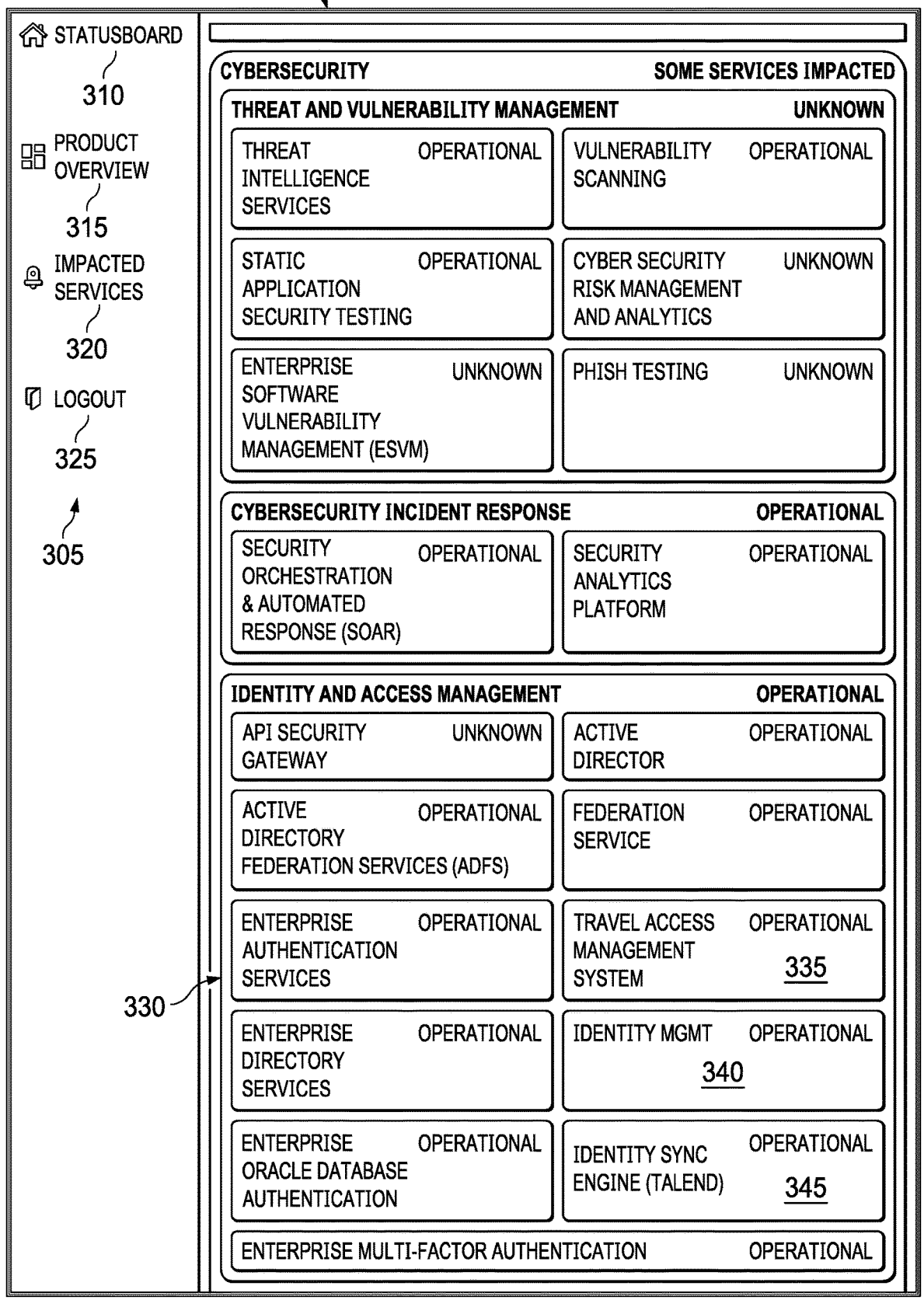
FIG. 6 is an illustration of yet another window displayed on the UI of the computer of FIG. 1, according to an example embodiment.

While the AA.com web application is listed as an example application/product in FIGS. 1, 2A, 2B, 4A-4B, and 5A-5B, the monitored application or program 75 can be a variety of applications and programs. FIG. 6 illustrates another window 300 that is displayed by the system 10. In some embodiments, the window 300 includes a menu 305 with selectable links associated with "Statusboard" 310, "Products Overview" 315, "Impacted Services" 320 and "Logout" 325. The window 300 also includes an arrangement of product names that allows a user to quickly identify interdependencies upon products and/or applications. For example, the Identify and Access Management Product-visually represented by the box labeled "Identity and Access Management" 330-includes several applications in the Identity and Access space, which is visually represented by the boxes labeled "Travel Access Management System" 335, "Identity Mgmt" 340, "Identity Sync Engine" 345, among others. The nesting or grouping of these child applications and products that are supporting a parent application allows for focus to be on what the product delivers rather than the specific application features. This, in turn, allows for quicker troubleshooting and resolution of identified errors. While the status of each system/application/interface/program is reported individually, the results are aggregated into a hierarchical model. The arrangement of products/applications in the FIG. 6 includes the first grouping, in which one set of children are grouped within its parent product/application box and a second grouping, in which the parent product/application boxes are grouped under a product name, such as Cybersecurity as illustrated in FIG. 6. Similar to the statusboard 70, the first and second groupings in FIG. 6 provide some of the same benefits as the statusboard 70. As illustrated in FIG. 6, each box associated with a product/application/system is labeled "operational" or "fully operational," "unknown," and "some services degraded." The name and color of the label can be the visual indicator indicating the health status of the system/application/interface/program. If a child element is reporting operational issues, then all of its parents in the hierarchy are marked as "some services degraded." Similarly, if a parent is marked as "fully operational" than all of the children are equally operational. This allows for both a summary of the status for over 1,500 service components within IT to the four top-level (portfolio) groups and also makes it easy to logically navigate the catalog.

In some embodiments, each of the status icons 90 is selectable and upon selection, additional information regarding the recent health checks associated with that status icon is displayed on the window. In some embodiments, each interface in the listing of interfaces 80 is selectable and upon selection, additional information regarding the interface is displayed on the window 50. In some embodiments, the boxes and/or labels illustrated in FIG. 6 are selectable and upon selection, display additional information regarding recent health checks or other data relating to the label associated with the box.

In some embodiments, the display, via the application 40, of the status icons 90 simultaneously in the first grouping and the second grouping improves the technical field of error detection in complex digital ecosystems. For example, with conventional systems, there is no display that provides a similar visual indication of the overall health of an application or program within a complex digital ecosystem. As noted previously and when using conventional technology, the user would need to open and navigate through multiple applications in an attempt to identity a source error. With over 1,500 systems, narrowing down the cause or location of a source error can take time, which can result in lost time or gaps in a business's operations. Even with a computer with a larger screen or multiple screens, it is not feasible or possible to display a sufficient number of windows to quickly identify a source error using conventional technology.

Here, the application 40 addresses problems with efficiency in using electronic devices, even those with large, medium, small, or multiple screens, because the visual status icons 90 allow for the quick and intuitive detection of underlying error(s).

In some embodiments, and when the status icons 90 and/or the interface names are selectable, the application 40 also allows for additional information to be displayed regarding error(s) or the interface itself. As such, a user of the application 40 can quickly access data in electronic devices, which improves the speed of a user's access through various data and additional details.

In some embodiments, and when the status icons 90 and/or the interface names are selectable, the application 40 opens another application that executed the health check to provide additional information regarding the health checks represented by the status icon. As such, a user of the application 40 can quickly access different applications, which improves the speed of a user's access through various applications.

In several exemplary embodiments, the system 10 includes an arrangement of elements that is a technical improvement over the previous ways of monitoring errors and detecting source errors. The system 10 is a technical solution to problems associated with the displays of conventional applications that monitor errors in digital ecosystems. Specifically, the ability to monitor for failed healthchecks and the ability to review the status in a comprehensive manner (e.g., simultaneous viewing the first grouping of status icons and the second grouping of status icons) via the application 40 addresses the problems of conventional technology in the field of application monitoring and error detection. As such, the system 10 and/or the method 200 involve a practical application of error detection and monitoring in a complex digital ecosystem.

Figure 7:
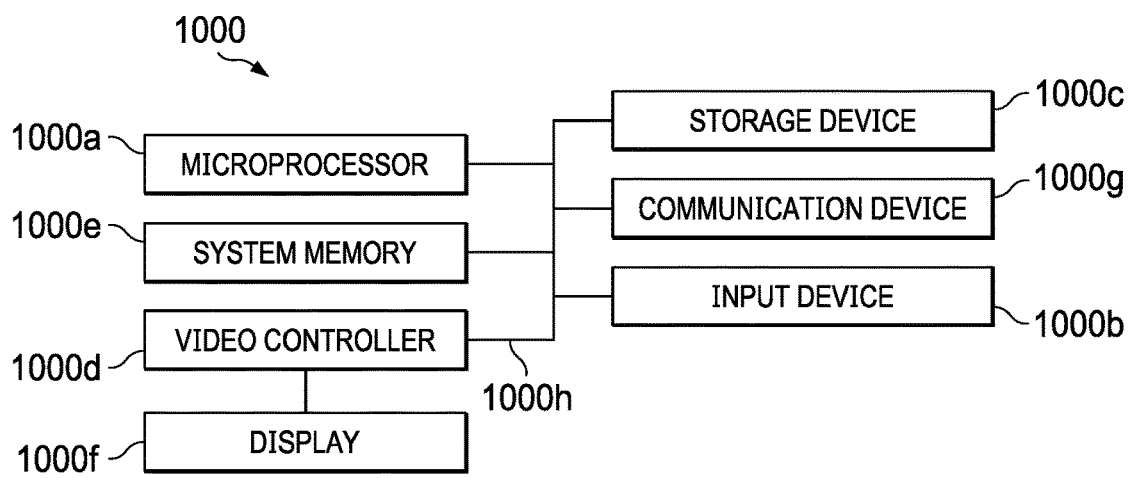
FIG. 7 is a diagrammatic illustration of a computing device, or node, for implementing one or more example embodiments of the present disclosure, according to an example embodiment.

In an example embodiment, as illustrated in FIG. 7 with continuing reference to FIGS. 1, 2A, 2B, 3, 4A, 4B, 5A, 5B, and 6, an illustrative node 1000 for implementing one or more of the example embodiments described above and/or illustrated in FIGS. 1, 2A, 2B, 3, 4A, 4B, 5A, 5B, and 6 is depicted. The node 1000 includes a microprocessor 1000a, an input device 1000b, a storage device 1000c, a video controller 1000d, a system memory 1000e, a display 1000f, and a communication device 1000g, all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1, 2A, 2B, 3, 4A, 4B, 5A, 5B, and 6 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1, 2A, 2B, 3, 4A, 4B, 5A, 5B, and 6 include respective pluralities of same components.

In several example embodiments, one or more of the applications, systems, and application programs described above and/or illustrated in FIGS. 1, 2A, 2B, 3, 4A, 4B, 5A, 5B, and 6 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous Javascript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as on "the cloud," for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, instructions are stored on a non-transitory computer readable medium and executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure. For example, instead of, or in addition to, transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries.

The present disclosure introduces a computing device that includes a display screen, the computing device being configured to display on the display screen a listing of interfaces and associated status icons that together provide a visual indication of a health status of a monitored application; wherein each interface in the listing of interfaces affects the health of the monitored application; wherein the interfaces in the listing of interfaces are grouped by a common dependency from a plurality of common dependencies; wherein each interface in the listing of interfaces is associated with a first physical host location and a second physical host location; wherein each interface in the listing of interfaces is associated with a set of status icons; wherein each status icon includes a visual indicator indicating a status of its associated interface; wherein the status icons are simultaneously arranged in: a first grouping visually depicting either the first physical host location or the second physical host location; and a second grouping visually depicting dependencies common between interfaces; and wherein the combination of the visual indicators in the first grouping and the second grouping provides the visual indication of the health status of the monitored application. In one embodiment, the visual indicators include a color; wherein the status of an interface is determined by health checks of the interface over a period of time; wherein the color is a first color when a number of failed health checks within a predetermined period of time is less than or equal to a threshold value; and wherein the color is a second color when the number of failed health checks within the predetermined period of time is greater than the threshold value. In one embodiment the visual indicators include a numerical value; wherein the status of an interface is determined by health checks of the interface over a period of time; and wherein the numerical value indicates a number of failed health checks within a predetermined period of time. In one embodiment, the first grouping is arranged along a first axis and the second grouping is arranged along a second axis that is perpendicular to the first axis. In one embodiment, the arrangement of the status icons along the first axis visually depicts the status of the interface at the first physical host location or the status of the interface at the second physical host location; and wherein the arrangement of the status icons along the second axis visually depicts a common dependency from the plurality of common dependencies for each interface. In one embodiment, a first common dependency from the plurality of common dependencies is a dependency upon an Enterprise Service Oriented Architecture; and wherein the interfaces having the first common dependency are grouped together along the second axis. In one embodiment, a second common dependency from the plurality of common dependencies is a dependency upon an external system; and wherein the interfaces having the second common dependency are grouped together along the second axis. In one embodiment, the visual indicator is based on a number of failed health checks within a predetermined period of time; wherein the computing device is configured to receive data regarding the number of failed health checks within the predetermined period of time; and wherein the computing device is configured to update the display screen in accordance with the received data. In one embodiment, the computing device is further configured to display on the display screen an indication of an importance of each interface. In one embodiment, the listing of interfaces is arranged in a first column such that each interface is associated with a row within the first column; wherein the set of status icons associated with each interface is arranged in the row associated with its respective interface; wherein the status of an interface is determined by health checks of the interface over a first period of time and a second period of time; wherein the first period of time is different from the second period of time; wherein first status icons from the sets of status icons are associated with the first period of time and are arranged in a second column; wherein second status icons from the sets of status icons are associated with the second period of time and are arranged in a third column; wherein the visual indication of the health status of the monitored application includes a visual timeline of the health status of the monitored application; and wherein the combination of the visual indicators of the first status icons and the second status icons provides the visual timeline.

The present disclosure introduces a method that includes displaying, on a display screen of a computing device, a listing of interfaces and associated status icons that together provide a visual indication of a health status of a monitored application; wherein each interface in the listing of interfaces affects the health of the monitored application; wherein the interfaces in the listing of interfaces are grouped by a common dependency from a plurality of common dependencies; wherein each interface in the listing of interfaces is associated with a first physical host location and a second physical host location; wherein each interface in the listing of interfaces is associated with a set of status icons; wherein each status icon includes a visual indicator indicating a status of its associated interface; wherein the status icons are simultaneously arranged in: a first grouping visually depicting either the first physical host location or the second physical host location; and a second grouping visually depicting dependencies common between interfaces; and wherein the combination of the visual indicators in the first grouping and the second grouping provides the visual indication of the health status of the monitored application. In one embodiment, the visual indicators include a color; wherein the status of an interface is determined by health checks of the interface over a period of time; wherein the color is a first color when a number of failed health checks within a predetermined period of time is less than or equal to a threshold value; and wherein the color is a second color when the number of failed health checks within the predetermined period of time is greater than the threshold value. In one embodiment, the visual indicators include a numerical value; wherein the status of an interface is determined by health checks of the interface over a period of time; and wherein the numerical value indicates a number of failed health checks within a predetermined period of time. In one embodiment, the first grouping is arranged along a first axis and the second grouping is arranged along a second axis that is perpendicular to the first axis. In one embodiment, the arrangement of the status icons along the first axis visually depicts the status of the interface at the first physical host location or the status of the interface at the second physical host location; and wherein the arrangement of the status icons along the second axis visually depicts a common dependency from the plurality of common dependencies for each interface. In one embodiment, a first common dependency from the plurality of common dependencies is a dependency upon an Enterprise Service Oriented Architecture; and wherein the interfaces having the first common dependency are grouped together along the second axis. In one embodiment, a second common dependency from the plurality of common dependencies is a dependency upon an external system; and wherein the interfaces having the second common dependency are grouped together along the second axis. In one embodiment, the visual indicator is based on a number of failed health checks within a predetermined period of time; and wherein the method further includes: receiving, by the computing device, data regarding the number of failed health checks within the predetermined period of time; and updating the display screen in accordance with the received data. In one embodiment, the method also includes displaying on the display screen an indication of an importance of each interface. In one embodiment, the listing of interfaces is arranged in a first column such that each interface is associated with a row within the first column; wherein the set of status icons associated with each interface is arranged in the row associated with its respective interface; wherein the status of an interface is determined by health checks of the interface over a first period of time and a second period of time; wherein the first period of time is different from the second period of time; wherein first status icons from the sets of status icons are associated with the first period of time and are arranged in a second column; wherein second status icons from the sets of status icons are associated with the second period of time and are arranged in a third column; wherein the visual indication of the health status of the monitored application includes a visual timeline of the health status of the monitored application; and wherein the combination of the visual indicators of the first status icons and the second status icons provides the visual timeline.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A computing device comprising a display screen, the computing device being configured to display on the display screen a listing of interfaces and associated status icons that together provide a visual indication of a health status of a monitored application;
   wherein each interface in the listing of interfaces affects the health of the monitored application;
   wherein each interface is an interface between two applications;
   wherein the interfaces in the listing of interfaces are grouped by a common dependency from a plurality of common dependencies;
   wherein each interface in the listing of interfaces is associated with a first physical host location and a second physical host location;
   wherein each interface in the listing of interfaces is associated with a set of status icons;
   wherein each status icon comprises a visual indicator indicating a status of its associated interface;
   wherein the status icons are simultaneously arranged in:
      a first grouping visually depicting either the first physical host location or the second physical host location; and
      a second grouping visually depicting dependencies common between interfaces;
   wherein the combination of the visual indicators in the first grouping and the second grouping provides the visual indication of the health status of the monitored application;
   wherein the listing of interfaces is arranged in a first column such that each interface is associated with a row intersecting the first column;
   wherein the set of status icons associated with each interface is arranged in the row associated with its respective interface;
   wherein the status of an interface is determined by health checks of the interface over a first period of time and a second period of time;
   wherein the first period of time is different from the second period of time;
   wherein first status icons from the sets of status icons are associated with the first period of time and are arranged in a second column;
   wherein second status icons from the sets of status icons are associated with the second period of time and are arranged in a third column;
   wherein each of the heath checks of the respective interfaces over the first period of time is associated with a first threshold value;
   wherein the first threshold values are arranged in a fourth column;
   wherein each of the health checks of the respective interfaces over the second period of time is associated with a second threshold value;
   wherein the second threshold values are arranged in a fifth column;
   wherein the second threshold value is different from the first threshold value; and
   wherein the first status icons and the second status icons provide, over at least the second period of time, the visual indication of the health status of the monitored application.

2. The computing device of claim 1,
wherein the visual indicators comprise respective colors;
wherein the color of the first status icons from the sets of status icons is a first color when a number of failed health checks within the first period of time is less than or equal to the first threshold value;
wherein the color of the second status icons from the sets of status icons is the first color when a number of failed health checks within the second period of time is less than or equal to the second threshold value;
wherein the color of the first status icons from the sets of status icons is a second color when the number of failed health checks within the first period of time is greater than the first threshold value; and
wherein the color of the second status icons from the sets of status icons is the second color when the number of failed health checks within the second period of time is greater than the second threshold value.

3. The computing device of claim 2,
wherein each of the visual indicators comprise a respective numerical value;
wherein the numerical value of first status icons from the sets of status icons indicates a number of failed health checks within a predetermined the first period of time; and
wherein the numerical value of second status icons from the sets of status icons indicates a number of failed health checks within the second period of time.

4. The computing device of claim 1,
wherein the first grouping is arranged along a first axis and the second grouping is arranged along a second axis that is perpendicular to the first axis;
wherein each of the first, second, third, fourth, and fifth columns extend vertically and along the second axis; and
wherein each of the rows extends horizontally and along the first axis.

5. The computing device of claim 4,
wherein the arrangement of the status icons along the first axis visually depicts the status of the interface at the first physical host location or the status of the interface at the second physical host location; and
wherein the arrangement of the status icons along the second axis visually depicts the common dependency from the plurality of common dependencies for each interface.

6. The computing device of claim 5,
wherein a first common dependency from the plurality of common dependencies is a dependency upon an Enterprise Service Oriented Architecture; and
wherein the interfaces having the first common dependency are grouped together along the second axis.

7. The computing device of claim 5,
wherein a second common dependency from the plurality of common dependencies is a dependency upon an external system; and
wherein the interfaces having the second common dependency are grouped together along the second axis.

8. The computing device of claim 1,
wherein the visual indicator is based on a number of failed health checks within the first period of time or the second period of time;
wherein the computing device is configured to receive data regarding the number of failed health checks within the first period of time and the second period of time; and
wherein the computing device is configured to update the display screen in accordance with the received data.

9. The computing device of claim 1, wherein the computing device is further configured to display on the display screen an indication of an importance of each interface.

10. The computing device of claim 1,
wherein the visual indication of the health status of the monitored application comprises a visual timeline of the health status of the monitored application; and
wherein the combination of the visual indicators of the first status icons and the second status icons provides the visual timeline.

11. The computing device of claim 1, wherein, for a plurality of the interfaces in the listing of interfaces, one of the two applications is the monitored application.

12. The computing device of claim 1,
wherein each interface is a type of interface from a plurality of types of interfaces; and
wherein a type of health check associated with an interface is dependent upon the type of interface.

13. The system of claim 1, wherein the first period of time is subsumed within the second period of time.

14. A method comprising displaying, on a display screen of a computing device, a listing of interfaces and associated status icons that together provide a visual indication of a health status of a monitored application;
wherein each interface in the listing of interfaces affects the health of the monitored application;
wherein each interface is an interface between two applications; wherein the interfaces in the listing of interfaces are grouped by a common dependency from a plurality of common dependencies;
wherein each interface in the listing of interfaces is associated with a first physical host location and a second physical host location;
wherein each interface in the listing of interfaces is associated with a set of status icons;
wherein each status icon comprises a visual indicator indicating a status of its associated interface;
wherein the status icons are simultaneously arranged in:
a first grouping visually depicting either the first physical host location or the second physical host location; and
a second grouping visually depicting dependencies common between interfaces;
wherein the combination of the visual indicators in the first grouping and the second grouping provides the visual indication of the health status of the monitored application;
wherein the listing of interfaces is arranged in a first column such that each interface is associated with a row intersecting the first column;
wherein the set of status icons associated with each interface is arranged in the row associated with its respective interface;
wherein the status of an interface is determined by health checks of the interface over a first period of time and a second period of time;
wherein the first period of time is different from the second period of time;
wherein first status icons from the sets of status icons are associated with the first period of time and are arranged in a second column;
wherein second status icons from the sets of status icons are associated with the second period of time and are arranged in a third column;

wherein each of the heath checks of the respective interfaces over the first period of time is associated with a first threshold value;
wherein the first threshold values are arranged in a fourth column;
wherein each of the health checks of the respective interfaces over the second period of time is associated with a second threshold value;
wherein the second threshold values are arranged in a fifth column;
wherein the second threshold value is different from the first threshold value; and
wherein the first status icons and the second status icons provide, over at least the second period of time, the visual indication of the health status of the monitored application.

15. The method of claim 14,
wherein the visual indicators comprise respective colors;
wherein the color of the first status icons from the sets of status icons is a first color when a number of failed health checks within the first period of time is less than or equal to the first threshold value;
wherein the color of the second status icons from the sets of status icons is the first color when a number of failed health checks within the second period of time is less than or equal to the second threshold value;
wherein the color of the first status icons from the sets of status icons is a second color when the number of failed health checks within the first period of time is greater than the first threshold value; and
wherein the color of the second status icons from the sets of status icons is the second color when the number of failed health checks within the second period of time is greater than the second threshold value.

16. The method of claim 15,
wherein each of the visual indicators comprise a respective numerical value;
wherein the numerical value of first status icons from the sets of status icons indicates a number of failed health checks within the first period of time; and
wherein the numerical value of second status icons from the sets of status icons indicates a number of failed health checks within the second period of time.

17. The method of claim 14,
wherein the first grouping is arranged along a first axis and the second grouping is arranged along a second axis that is perpendicular to the first axis;
wherein each of the first, second, third, fourth, and fifth columns extend vertically and along the second axis; and
wherein each of the rows extends horizontally and along the first axis.

18. The method of claim 17,
wherein the arrangement of the status icons along the first axis visually depicts the status of the interface at the first physical host location or the status of the interface at the second physical host location; and
wherein the arrangement of the status icons along the second axis visually depicts the common dependency from the plurality of common dependencies for each interface.

19. The method of claim 18,
wherein a first common dependency from the plurality of common dependencies is a dependency upon an Enterprise Service Oriented Architecture; and
wherein the interfaces having the first common dependency are grouped together along the second axis.

20. The method of claim 18,
wherein a second common dependency from the plurality of common dependencies is a dependency upon an external system; and
wherein the interfaces having the second common dependency are grouped together along the second axis.

21. The method of claim 14,
wherein the visual indicator is based on a number of failed health checks within the first period of time or the second period of time; and
wherein the method further comprises:
receiving, by the computing device, data regarding the number of failed health checks within the first period of time and the second period of time; and
updating the display screen in accordance with the received data.

22. The method of claim 14, further comprising displaying on the display screen an indication of an importance of each interface.

23. The method of claim 14,
wherein the visual indication of the health status of the monitored application comprises a visual timeline of the health status of the monitored application; and
wherein the combination of the visual indicators of the first status icons and the second status icons provides the visual timeline.

24. The method of claim 14, wherein, for a plurality of the interfaces in the listing of interfaces, one of the two applications is the monitored application.

25. The method of claim 14,
wherein each interface is a type of interface from a plurality of types of interfaces; and
wherein a type of health check associated with an interface is dependent upon the type of interface.

26. The method of claim 14, wherein the first period of time is subsumed within the second period of time.

* * * * *

UNITED STATES PATENT AND TRADEMARK OFFICE
CERTIFICATE OF CORRECTION

PATENT NO. : 12,169,433 B1
APPLICATION NO. : 17/742995
DATED : December 17, 2024
INVENTOR(S) : Luis Medina et al.

Page 1 of 1

It is certified that error appears in the above-identified patent and that said Letters Patent is hereby corrected as shown below:

In the Claims

Column 17, Claim 3, Line 25, delete "a predetermined" after -- checks within --

Signed and Sealed this
Fourth Day of February, 2025

Coke Morgan Stewart
*Acting Director of the United States Patent and Trademark Office*